United States Patent [19]

Seckler et al.

[11] 3,802,627
[45] Apr. 9, 1974

[54] IRRIGATION APPARATUS

[75] Inventors: David Seckler, Fort Collins, Colo.;
David Porat, Brookline, Mass.

[73] Assignee: Sterling Square Sprinkler Company, Inc., Sterling, Colo.

[22] Filed: Nov. 15, 1972

[21] Appl. No.: 306,545

[52] U.S. Cl. .................................. 239/212, 137/344
[51] Int. Cl. ........................... B05b 9/02, E01h 3/02
[58] Field of Search ............ 239/212, 213; 137/344

[56] References Cited
UNITED STATES PATENTS

| | | | |
|---|---|---|---|
| 2,941,727 | 6/1960 | Zybach | 239/212 X |
| 3,623,662 | 11/1971 | Reinke | 239/213 X |
| 3,662,776 | 5/1972 | Bryant et al. | 137/344 |
| 3,352,493 | 11/1967 | Curtis | 137/344 X |
| 3,394,729 | 7/1968 | Bower et al. | 137/344 |
| 3,493,176 | 2/1970 | Kinkead | 137/344 X |
| 3,587,763 | 6/1971 | Kinkead | 137/344 X |
| 3,606,160 | 9/1971 | Bonds et al. | 137/344 X |

*Primary Examiner*—Samuel Scott
*Attorney, Agent, or Firm*—Darby & Darby

[57] ABSTRACT

Self-propelled irrigation apparatus for watering non-circular areas includes a main arm assembly pivoted at one end and supported at intervals by self-propelled support towers. An extension arm assembly is mounted on self-propelled support towers and has one end pivotally connected to the free end of the main arm assembly for irrigating portions of the field outside the circular area traversed by the main arm. Electrical control means are provided to rotate the extension arm assembly relative to the main arm assembly as the latter rotates.

20 Claims, 8 Drawing Figures

IRRIGATION APPARATUS

This invention relates generally to irrigation apparatus, and, more particularly, to self-propelled irrigation apparatus of the center pivot type.

One popular manner of irrigating crops is through sprinkler irrigation. Of the various types of sprinkler apparatus, it has been found that the self-propelled, center pivot irrigation apparatus is the most effective type for irrigating large sections of land economically and in a uniform manner. Self-propelled irrigation apparatus of the center pivot type comprises an elongated main arm assembly, usually including several sections connected at their ends, supported at intervals by self-propelling wheeled support towers. The main arm assembly supports, or may itself constitute, a fluid carrying conduit and includes a large number of sprinklers or nozzles spaced along its length. One end of the assembly is pivotally coupled to a base and water supplied to the conduit is discharged from the sprinklers as the assembly rotates around the base, thereby uniformly irrigating a section of land.

One problem inherent in the use of such devices is that the irrigated section necessarily takes the form of a circle (with the arm as its radius). Thus, the use of center pivot type irrigation apparatus within a square section of land will result in a substantial portion of the land (outside that circle) remaining un-irrigated. It has been estimated that such systems fail to cover 21.4 percent of the potentially agriculturally productive area of a square field.

One method of attacking this problem has been to provide fluid discharge means, such as a water gun at the end of the arm assembly facing radially outwardly. Water is discharged through this gun when it faces the un-irrigated portions of the land. Such systems have not proved to be entirely adequate, however, since only a relatively narrow additional arc of land can be irrigated, and, moreover, these water-guns expel large droplets of water which can cause damage to delicate crops.

The present invention provides irrigating apparatus which is capable of irrigating sections of a field outside the circular area traversed by the main arm assembly of a center pivot irrigating apparatus. It avoids, or substantially minimizes, the drawbacks associated with known water-gun systems for accomplishing this objective, yet it is simple and relatively inexpensive. A particular advantage of the invention is that it may be readily incorporated into existing center pivot irrigation systems so that replacement of these costly systems is not required.

Briefly, in accordance with the invention, an extension arm is mounted at the free end of a main arm assembly which rotates about a center pivot. The extension arm carries sprinklers which irrigate areas outside of the circular area covered by the main arm assembly, and it is movable with respect to the main arm assembly to control the areas which it (the extension arm) covers. In the preferred embodiment of the invention, the extension arm pivots with respect to the main arm assembly and the position of the extension arm is controlled electrically as a function of the angular position of the main arm assembly.

The invention is described in detail below with reference to the annexed drawings, wherein.

Figure 1:
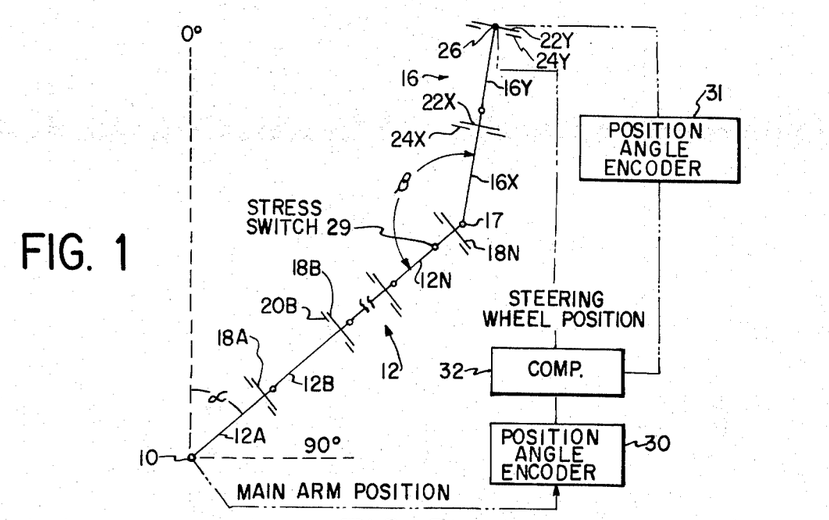
FIG. 1 is a diagrammatic illustration of the preferred embodiment of the invention.

The basic operation of this system according to the invention is explained with reference to FIG. 1. The main arm assembly, shown generally at 12, includes a plurality of separate sections 12A, 12B...12N, which are colinearly aligned. The extension arm is shown at 16 and, for example, may include two sections 16X and 16Y. The extension arm section 16X is pivotally mounted at 17 to the outer or free extremity of the main arm section 12N.

Each of the main arm sections 12A, B...N is supported on a respective support tower 18A, B...N, on which pairs of wheels 20A, B...N are mounted. The extension arm sections 16X and 16Y are supported on towers 22X and 22Y which contain respective pairs of wheels 24X and 24Y. The constructions of the support towers 18 and 22 are identical except that the wheels 24X and 24Y are steerable. In practice, a single steering motor shown diagrammatically at 26 may be used to control the wheels 24Y with the wheels 24X being allowed to follow the wheels 24Y either passively or with a power assist.

Water is supplied to the main arm assembly 12 and the extension arm assembly 16 both of which include sprinkler devices to distribute the water over the length of these arms. The main arm assembly may, for example, be 1,200 feet in length and require anywhere from 24 to 72 hours to rotate 360°.

Obviously, the main arm assembly 12, which may be considered to be fixed in length, is only capable of covering a circular area of the field. The extension arm assembly 16, when pivoted about point 17, permits irrigation of a section of the field outside of this circular area. By controlling the position of the arm 16 with respect to the main arm 12 (represented by the angle $\beta$), it is possible to irrigate non-circular areas so that in many cases an entire field can be fully irrigated.

Conventionally, irrigating apparatus of the type disclosed is self-propelled in the sense that each pair of wheels 20A, 20B...N, is driven by a motor (not shown in FIG. 1), for example, a constant speed electric motor. For purposes of explanation, the angular position of the main arm assembly 12 may be represented by the angle $\alpha$ (FIG. 1). If it is desired to irrigate a square field, $\beta$ should vary from 90° (at $\alpha = 0°$) to its maximum when $\alpha = 45°$ and back to 90° when $\alpha = 90°$. This pattern repeats for each of the successive quadrants in the case of a square field. For purposes of mechanical stability, it is generally desirable that the maximum value of $\beta$ be less than 180°, for example, 140°.

There are a number of ways in which movement of the extension arm 16 may be controlled. In the preferred embodiments, as explained below, the position of the steering wheels is controlled electrically as a function of the position angle $\alpha$ of the main arm 12.

As noted previously, the main extension arm consists of a series of sections 12A,B...N, which are joined at flexible joints. In prior art constructions, where there is no extension, the driving motor for the outermost support tower 18N is driven continuously. A microswitch is placed at the joint between the outermost section 12N and the next adjacent section. When the microswitch is actuated because of stress at the joint caused by movement of the outermost section 12N, the motor for this next section is actuated.

Similarly, movement of the second section actuates a microswitch at the junction of the second and third sections to operate the driving motor for the third section, and so forth for each of the remaining sections. Each of the motors drives its associated support wheels at the same rate of speed and, consequently, since the outermost section 12N travels at the highest rate of speed, the inner sections would be operated intermittently with the innermost section operating over the shortest periods. The system is relatively simple and inexpensive since constant-speed motors, all of which are the same, can be used and special gear reduction units are not required for the individual sections.

According to the preferred embodiment of the invention, the system is controlled by movement of the extension arm rather than the outermost section of the main arm. The drive motor for tower 18N is not continuously operated, but instead, is controlled by a stress switch shown diagrammatically at 29 in FIG. 1.

In one embodiment of the invention, a position angle encoder 30 is located at the base 10 for the main extension arm 12. The encoder 30 may be an analog-to-digital device which converts the angle $\alpha$ to a five-bit digital signal. A similar position angle encoder 31 is physically located at the support tower 22Y for the steering wheels 24Y, and also produces a five-bit digital signal representing the position angle of the steering wheels of the extension arm with respect to an arbitrarily selected reference angle (e.g. perpendicular to arm 16).

The two digital signals from the encoders 30 and 31 are coupled to an electrical comparator 32 which produces an electrical control signal when the two digital signals are not equal (or have any other preselected relationship). This electrical signal is coupled to the steering motor 26 which causes the wheels 24Y (and 24X) to turn until the encoded digital output representing the steering wheel position is equal (or otherwise corresponds) to the output from the main arm position angle encoder 30. At this position, the steering motor 26 is deactivated and the extension arm continues to rotate with the steering wheels in a fixed position.

As the extension arm 16 rotates, a position is reached where the stress on the main extension arm section 12N cause the stress switch 29 to be actuated. When switch 29 is actuated, it energizes the driving motor for the wheels on the main section 12N which then causes this section of the main extension arm to start moving. In a similar way, as described in the foregoing, the movement of this outer main section successively operates the drive motors associated with the remaining interior sections so that the main extension arm sweeps across the field.

Figure 2:
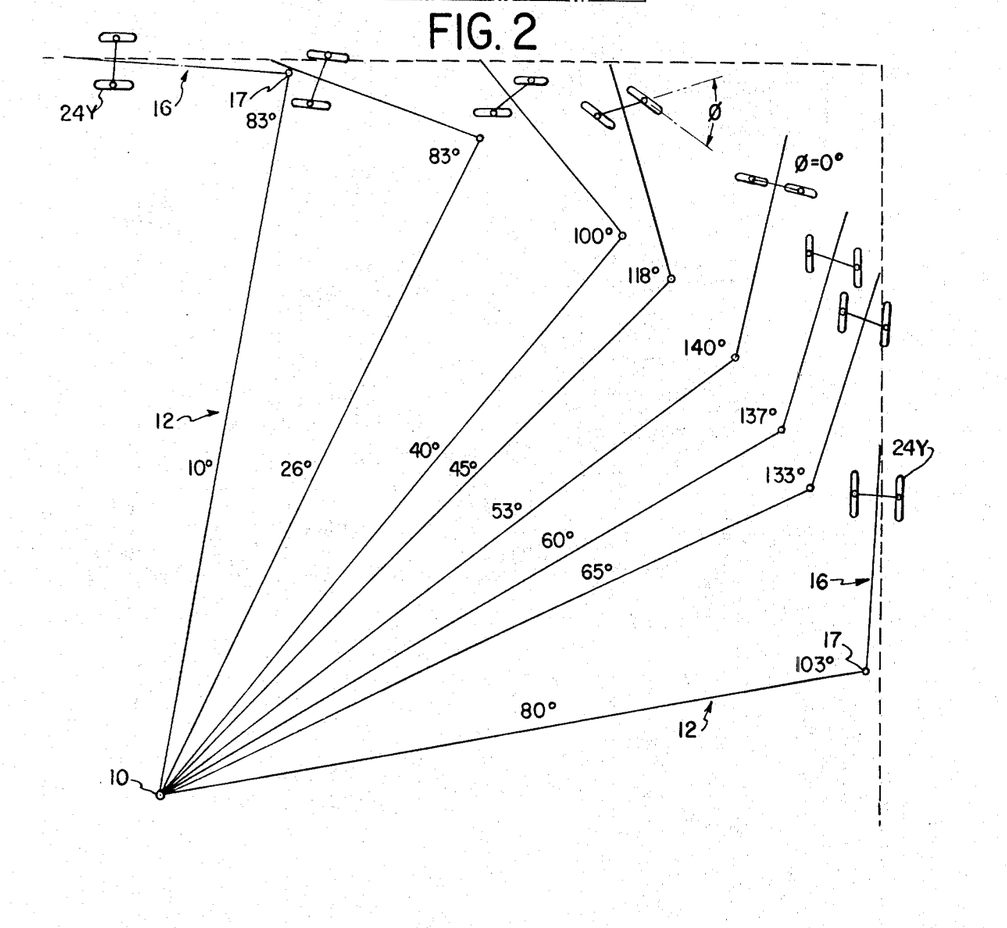
FIG. 2 shows diagrammatically the relative positions of the main arm assembly and extension arm for a representative scan of one quadrant of a field.

In this embodiment, it is necessary to determine the direction in which the steering wheels must be aligned for each discreet position of the main arm assembly. This can be done mathematically if the lengths of the respective assemblies and their relative velocities are known. The direction of the extension arm steering wheels 24Y for each discreet position ($\alpha$) of the main arm is in the same direction as the velocity vector required for the outer point of the extension arm 16 relative to the base 10. Hence, this velocity vector is computed for each discreet main arm position and then the encoder wheels (which produce a different digital signal for each main arm position) are properly positioned so as to cause the required control of the steering wheels. By way of example, FIG. 3 shows a workable relationship between the position angle $\alpha$ of the main arm and the steering wheel position angle $\phi$ as indicated in FIG. 2.

Figure 3:
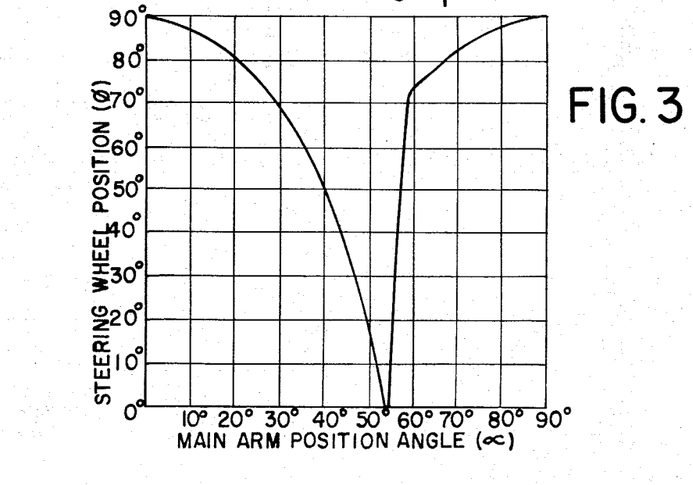
FIG. 3 is a graph showing steering wheel position as a function of the angle of the main arm assembly.

It may appear from FIG. 3 that unusually abrupt changes in steering wheel position are required between $\alpha = 40°$ and $\alpha = 60°$ in view of the movement of the main arm assembly; however, the linear velocity of the outer section of the main arm 12 is very low, for example, in the order of 300 feet per hour. Therefore, for all intents and purposes, the turning of the steering wheels 22Y may be considered to be instantaneous in the sense that the steering wheels are positioned very quickly with respect to the linear velocity of the assembly.

FIGS. 4A, 4B, 5 and 6, show certain mechanical features of a system incorporating the invention. The parts illustrated in these figures have been numbered to correspond with FIG. 1. Inasmuch as the construction of the main arm assembly is known, an extended discussion of the physical structure of the system is not included.

Figure 4A:
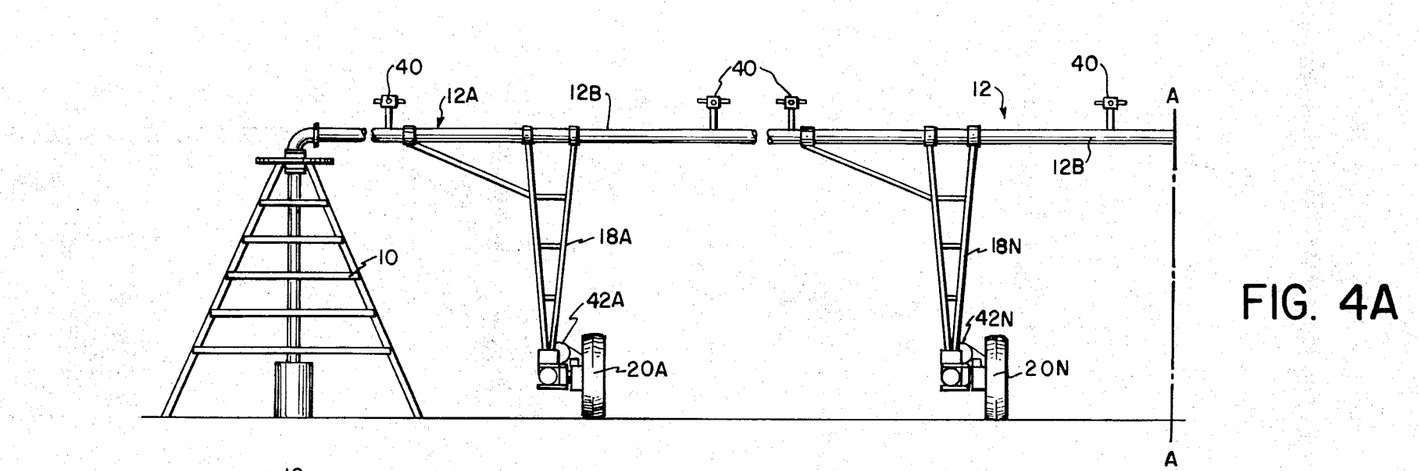
FIGS. 4A and 4B are front views of the main arm assembly and extension arm assembly, according to the invention.
Figure 4B:
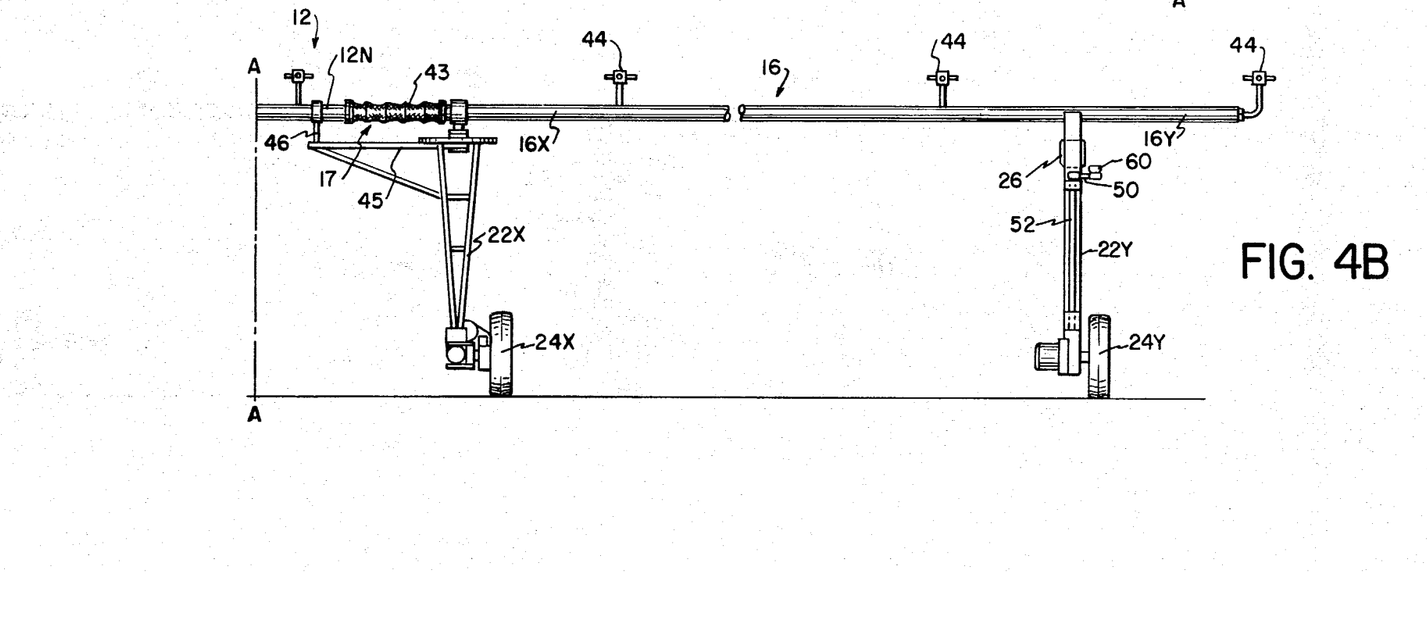

Sections 12A,12B...N of the main arm assembly are shown as consisting of hollow conduits through which water is applied to sprinklers 40 spaced along the individual sections. (Alternatively, a separate conduit for the water may be supported in conventional fashion on these sections). Drive motors 42A,42B...N are mounted on respective support towers 18A,18B...N to drive the wheels 20A,20B...N which rotate the main arm assembly. As mentioned above, the manner in which these motors are controlled is standard, except that operation of motor 42N is determined by the stress of the section 12N caused by rotation of the extension arm 16.

The outermost main arm section 12N may be coupled to the inner extension arm section 16A by a flexible hose 43 which will permit the required pivoting of extension arm 16 while supplying water to the extension arm sprinklers 44. Support tower 22X for the extension arm section 16X may include a plate 45 in which a pin 46 extending downwardly from section 12N is suitably journaled. Obviously, numerous other satisfactory arrangements can be used to provide the required pivotable movement between these two parts.

Figure 5:
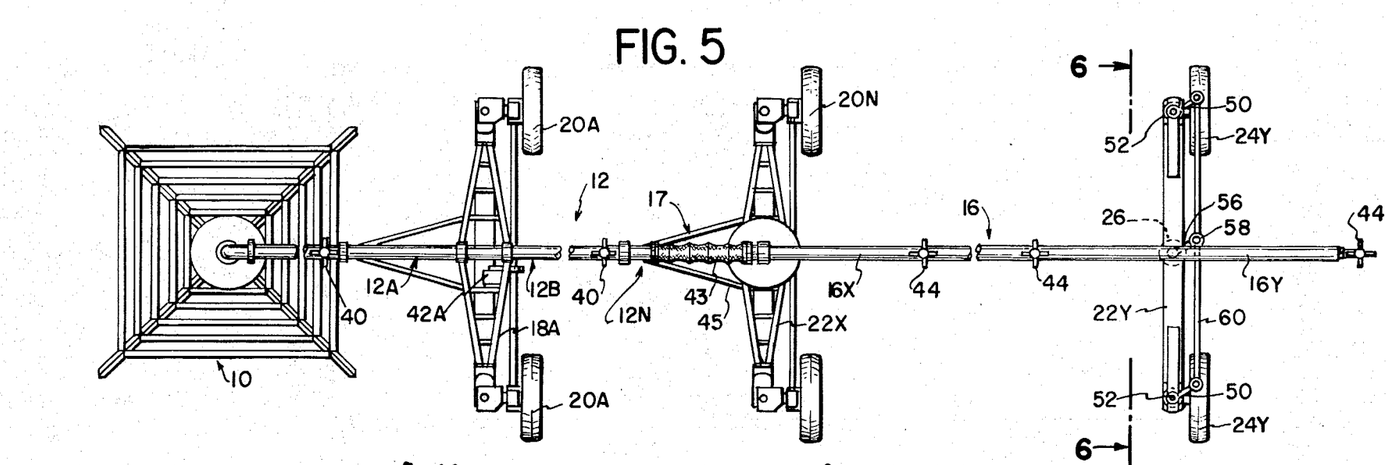
FIG. 5 is a plan view of the main and extension arm assemblies.
Figure 6:
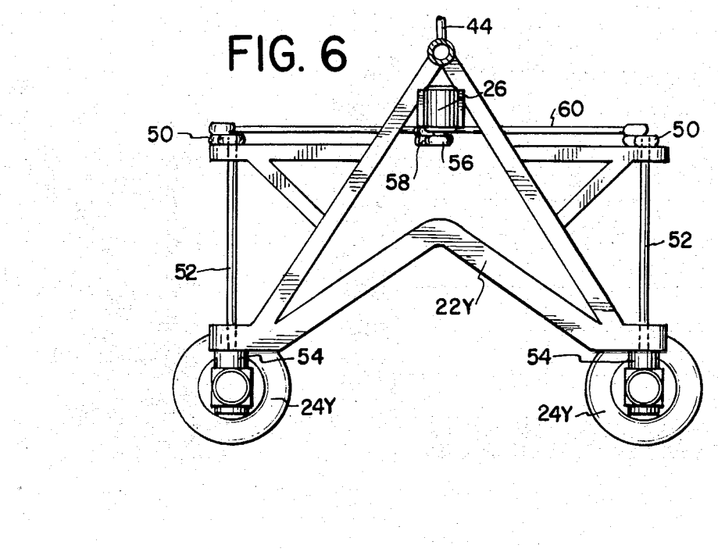
FIG. 6 is a sectional view along the line 6—6 of FIG. 5.

The steering arrangement for the steering wheels 24B is shown most clearly in FIGS. 5 and 6. The steering motor 26 is physically supported on support tower 22Y above the wheels. Motor 26 is a constant speed electrical motor which is turned on and off upon receipt of signals from comparator 34, as described above with reference to FIG. 1. The alignment or position of the steering wheels 22Y is controlled by a pin 50 connected to vertical connecting rods 52 which rotate axle supports 54 on which the wheels are mounted. The physical means for steering the wheels is conventional and, obviously, any suitable arrangement for steering wheels 22Y may be used.

As the assembly sweeps through any quadrant of the field, as explained above, it is necessary that the steering wheels be moved in first one direction so that the extension arm can start to move outwardly, and then back in the other direction so that the extension arm can return to its original position. Consequently, in practice, the steering wheels must be aligned in the same direction on two separate occasions during the sweep of any given quadrant (i.e., while "coming" and "going"). This creates a redundancy or ambiguity which ordinarily would require the electronic circuits of the comparator to measure the encoded position angle signals in such a way as to be able to determine the direction in which the extension arm is moving relative to the main arm.

According to a further feature of this embodiment, this requirement is avoided by a crank shaft type steering arrangement comprising a rotatable disc 56 which rotates in only one direction in response to the actuation of the steering motor 26. The disc 56 is connected to the pins 50 by means of a link 58 suitably pinned to the edge of disc 56 (see FIG. 6) at 59, the other end of link 58 being connected to pins 50 by horizontal tie rods 60. With this type of arrangement (and proper dimensioning and disposition of the steering mechanism), full rotation of disc 56 causes the steering wheel 22Y to rotate 90° in one direction (corresponding to rotation of disc 56 through 180°) and then back 90° to the starting position (as the disc 56 rotates from 180° to 360°). Consequently, since there is a discreet position of disc 56 for each position of the main arm assembly throughout any given quadrant, there no longer exists the ambiguity referred to above, although the full steering cycle is still available.

A booster pump (not shown) may be associated with the extension arm 16. The booster pump is desirable because the extension arm 16 moves at a higher velocity relative to ground than the main arm assembly 12. To assure uniform irrigation, it may be desirable to provide more water to the sprinklers on the extension arm. The booster pump may be turned off when the extension arm is at right angles to the main arm ($\alpha = 0$) and, if desired, may be operated to provide a variable water pressure at the extension arm sprinklers, depending upon the position of the extension arm. This control may be responsive to the encoded position angle signals in an obvious way. Control of the water pressure at the main arm sprinklers and/or sprinkler spacing may be pursuant to conventional practice.

Figure 7:
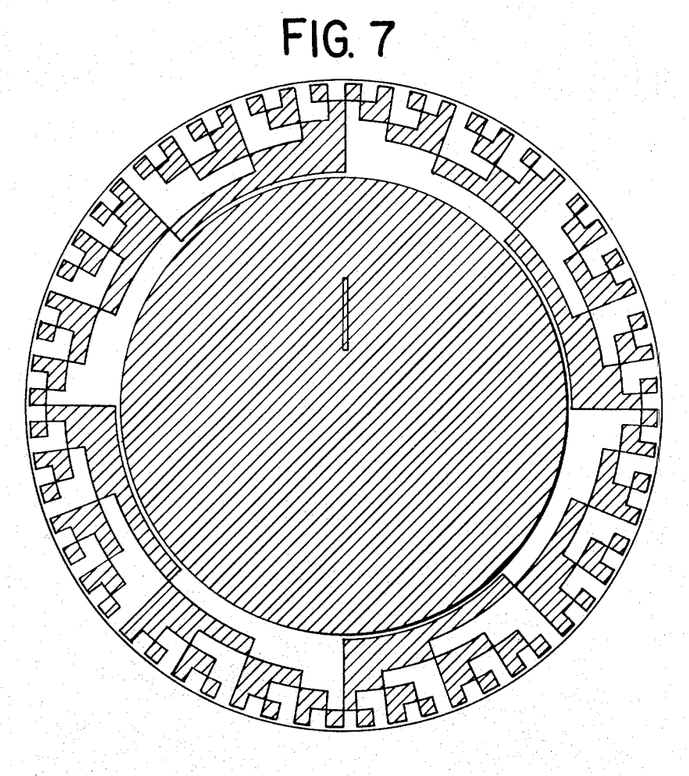
FIG. 7 shows one of the encoding wheels used in the preferred embodiment.

FIG. 7 illustrates an encoding wheel which may be used in accordance with the preferred embodiment of the invention. The wheel illustrated in FIG. 7 may be read by photoelectric means, and suitable devices for this purpose are known. A similar wheel may be used as the steering wheel encoder with the physical disposition of the respective wheels being properly adjusted to cause a desired relationship between the extension arm 16 and the main arm 12 for each discreet position of the main arm.

The encoding disc(s) or other encoding means may be modified as desired to alter the area covered by the combined main and extension arm assemblies. Similarly, although a preferred embodiment has been described, numerous other control systems could be used. For example, the control system may be responsive to a comparison of signals representing the position angles $\alpha$ and $\beta$. Other types of systems, such as hydraulic, may be used to control the movement of the extension arm.

What is claimed is:

1. Irrigating apparatus for supplying water to a noncircular area, comprising a rotatable main arm assembly for supplying water to a first portion of said area, an extension arm assembly at the end of said main arm assembly for supplying water to portions of said area outside of said first portion, means for moving said extension arm assembly with respect to said main arm assembly and control means for operating said moving means to move said extension arm assembly relative to said main arm assembly to irrigate said portions outside of said first portion as said main arm rotates.

2. Apparatus according to claim 1, wherein said moving means pivots said extension arm assembly relative to said main arm assembly.

3. Irrigating apparatus for supplying water to a noncircular area, comprising a rotatable main arm assembly for supplying water to a first portion of said area, an extension arm assembly pivotally mounted at the end of said main arm assembly for supplying water to portions of said area outside of said first portion, means for rotating said extension arm assembly relative to said main arm assembly, and control means for operating said moving means in response to the angular position of the main arm assembly relative to said area.

4. Apparatus according to claim 3, further including stress switch means located on said main arm assembly for initiating movement of said main arm assembly, said stress switch being actuated by stresses applied to said main arm assembly by movement of said extension arm assembly.

5. Apparatus according to claim 3, wherein said main arm assembly includes a plurality of colinear sections, each of said sections including independent driving means, the driving means of the outermost section being responsive to the forces applied to the main arm assembly by movement of said extension arm assembly.

6. Apparatus according to claim 3, wherein said main arm assembly and said extension arm assembly are mounted on support towers having wheels, at least one of the support towers for said extension arm assembly having steerable wheels, and wherein said moving means is adapted to steer said steerable wheels.

7. Irrigating apparatus according to claim 6, wherein said control means includes a main arm position angle encoder for producing a multi-bit digital signal representative of discreet positions of the main arm assembly, a steering wheel position encoder for producing a multi-bit digital signal representing the position of said steering wheel, and comparison means responsive to said multi-bit digital signals.

8. Irrigating apparatus for supplying water to a noncircular area, comprising a rotatable main arm assembly for supplying water to a first portion of said area, an extension arm assembly rotatably mounted at the free end of said main arm assembly for supplying water to portions of said area outside of said first portion, said main arm assembly and said extension arm assembly being supported on towers having wheels, at least one of the support towers for said extension arm assembly having steerable wheels, and steering means responsive to the angular position of the main arm assembly relative to said area for changing the direction of said steerable wheels to thereby rotate said extension arm assembly relative to said main arm assembly.

9. Apparatus according to claim 8, further including stress switch means located on said main arm assembly for initiating movement of said main arm assembly, said stress switch being actuated by stresses applied to said main arm assembly by movement of said extension arm assembly.

10. Apparatus according to claim 8, wherein said main arm assembly includes a plurality of colinear sections, each of said sections including independent driving means, the driving means of the outermost section being responsive to the forces applied to the main arm assembly by movement of said extension arm assembly.

11. Apparatus according to claim 8, wherein said steering means includes a member rotatable through 360°, and means coupling said member to said steering wheels with full rotation of said member turning said steering wheels a desired amount in one direction and then back that amount in the other direction.

12. Apparatus according to claim 8, wherein said steering means includes means for comparing said angular position of the main arm assembly to the position of said steerable wheels.

13. Apparatus according to claim 12, further including a main angle encoder for producing a digital signal representing the angular position of said main arm assembly and a steering wheel angle encoder for producing a digital signal representing the angular position of said steering wheels, said means for comparing being responsive to said digital signals.

14. Self-propelled irrigation apparatus of the center-pivot type comprising:
a main arm assembly pivotally coupled at a first end to a fixed base pivot;
an extension arm assembly pivotally coupled to the other end of the main arm assembly;
a fluid carrying conduit associated with the main and extension arm assemblies;
fluid discharge means spaced at intervals along the fluid carrying conduit;

means for moving the extension arm assembly with respect to the main arm assembly; and
control means for operating said moving means to vary the angular position of the extension arm assembly relative to the main arm assembly as the main arm assembly rotates.

15. Apparatus according to claim 14, wherein the extension arm assembly is mounted on at least one support tower having steerable wheels.

16. Apparatus as recited in claim 15, wherein the control means includes means responsive to the angular position of the main arm assembly with respect to the area being irrigated.

17. For use with a center-pivot irrigation apparatus which includes a main arm assembly mounted at a first end to a fixed base pivot and rotatable therearound, the main arm assembly including a fluid carrying conduit having fluid discharge means spaced at intervals therealong, the improvement comprising:
an extension arm assembly pivotally mounted to the other end of the main arm assembly for supporting a fluid carrying conduit;
means for moving the extension arm assembly with respect to the main arm assembly; and
control means for operating said moving means to vary the angular position of the extension arm assembly relative to the main arm assembly as the main arm assembly rotates.

18. The improvement of claim 17, wherein the extension arm assembly is mounted on wheels and further including means for steering and driving said wheels responsive to the angular position of the main arm assembly relative to the area being irrigated.

19. The improvement of claim 17, wherein said control means is responsive to the position of the main arm assembly relative to said area.

20. The improvement according to claim 17, wherein said moving means pivots said extension arm assembly first in one direction and then in the other, with the maximum angle between the main arm assembly and the extension arm assembly being less than 180°.

* * * * * of # UNITED STATES PATENT OFFICE
CERTIFICATE OF CORRECTION

Patent No. 3,802,627     Dated April 9, 1974

Inventor(s)    DAVID SECKLER and DAVID PORAT

It is certified that error appears in the above-identified patent and that said Letters Patent are hereby corrected as shown below:

IN THE SPECIFICATION:

Col. 3, line 57, change "cause" to --causes--

Col. 4, line 59, change "24B" to --24Y--

IN THE CLAIMS:

Claim 1, line 6, after "portion," insert --said extension arm assembly and main arm assembly each being supported on one or more support towers, with each assembly supporting a plurality of spaced irrigating sprinklers,-- line 8, after "sembly" insert a comma

Claim 3, line 6, after "portion," insert --said main arm assembly and said extension arm assembly each being supported on one or more support towers with each assembly including a plurality of spaced

PO-1050
(5/69)

UNITED STATES PATENT OFFICE
CERTIFICATE OF CORRECTION

Patent No. __3,802,627__ Dated __April 9, 1974__

Inventor(s) __DAVID SECKLER and DAVID PORAT__

It is certified that error appears in the above-identified patent and that said Letters Patent are hereby corrected as shown below:

Page 2 irrigating sprinklers,-- line 7, change "rotating" to --pivoting-- line 9, cancel "moving"

same line, after "means" insert --for pivoting--

Claim 6, lines 1 to 3, cancel "said main arm assembly and said extension arm assembly are mounted on support towers having wheels,"

line 5, change "having" to --has-- same line, cancel "moving"

last line, after "means" insert --for pivoting--

Claim 8, line 4, change "rotatably" to --pivotably-- line 8, after "on" insert --support-- same line, after "wheels" insert --and wheel driving means--

UNITED STATES PATENT OFFICE
CERTIFICATE OF CORRECTION

Patent No. 3,802,627  Dated April 9, 1974

Inventor(s) DAVID SECKLER and DAVID PORAT

It is certified that error appears in the above-identified patent and that said Letters Patent are hereby corrected as shown below:

Page 3 line 13, change "rotate" to --pivot--

Claim 10, line 3, cancel "including independent" and substitute --being mounted on at least one support tower with the-- line 4, after "means" (first occurrence) insert --for each section being independently operable--

Claim 14, line 10, after "conduit" insert --on both of said assemblies;

a plurality of support towers for supporting said main arm assembly and said extension arm assembly above the ground to be irrigated;--

PO-1050
(5/69)

UNITED STATES PATENT OFFICE
CERTIFICATE OF CORRECTION

Patent No. 3,802,627      Dated April 9, 1974

Inventor(s)     DAVID SECKLER and DAVID PORAT

It is certified that error appears in the above-identified patent and that said Letters Patent are hereby corrected as shown below:

Page 4

Claim 17, line 9, after "conduit" insert --and a plurality of spaced fluid discharge means;

at least one support tower for supporting said extension arm assembly above the ground to be irrigated;--

Claim 18, lines 1 to 3, cancel "the extension arm assembly is mounted on wheels and further including" and substitute --each support tower for the extension arm assembly includes steerable wheels and said moving means includes--

Signed and sealed this 10th day of September 1974.

(SEAL)
Attest:

McCOY M. GIBSON, JR.
Attesting Officer

C. MARSHALL DANN
Commissioner of Patents